May 28, 1957 L. L. JONES 2,794,155
HANDLING AND LOCKING STRUCTURE FOR SWITCHBOARD PANEL UNITS
Filed Jan. 4, 1956 3 Sheets-Sheet 1

INVENTOR.
LESTER L. JONES
BY
Darby & Darby
ATTORNEYS

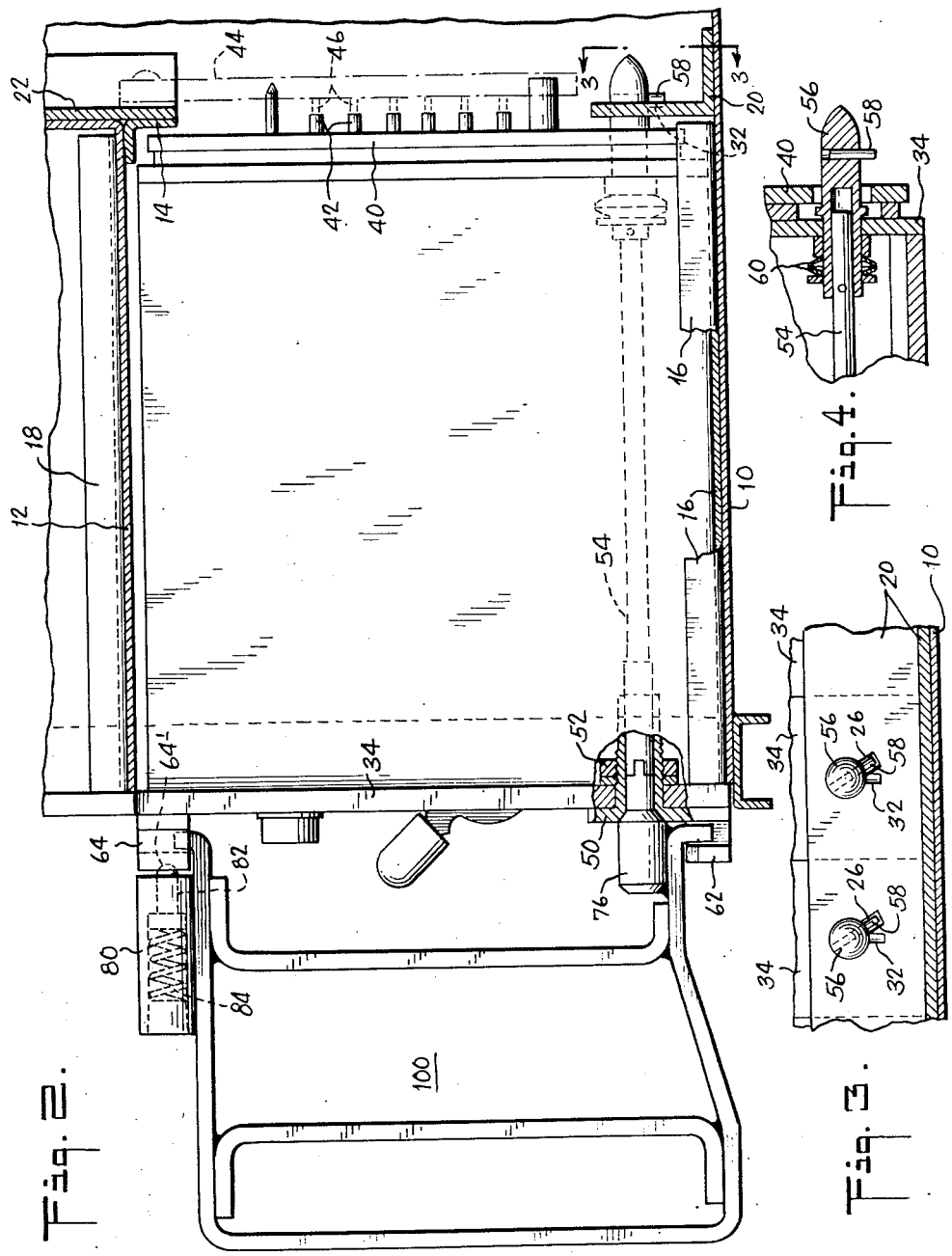

May 28, 1957  L. L. JONES  2,794,155
HANDLING AND LOCKING STRUCTURE FOR SWITCHBOARD PANEL UNITS
Filed Jan. 4, 1956  3 Sheets-Sheet 3
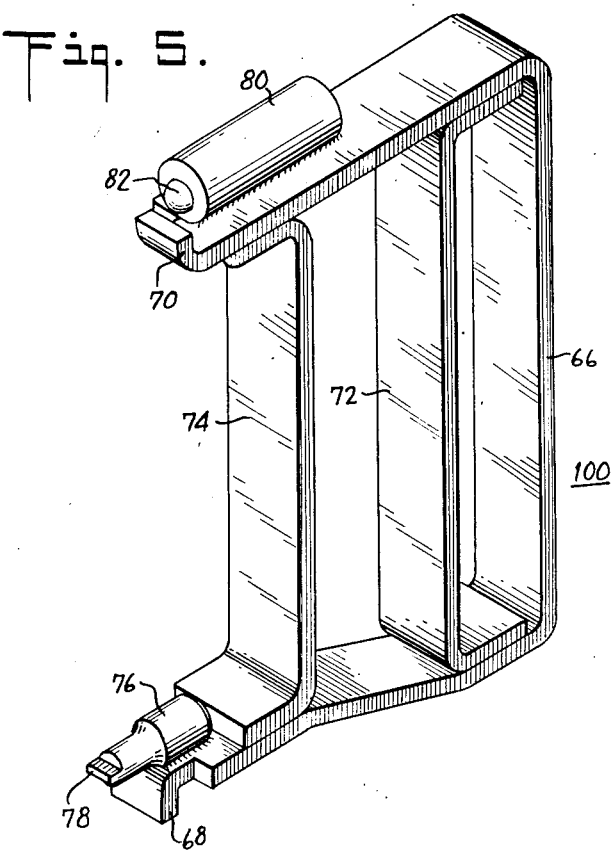
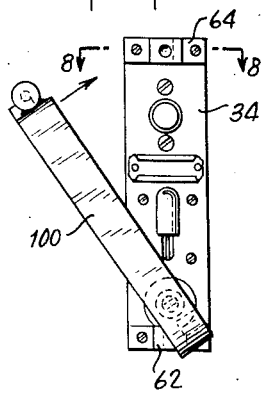 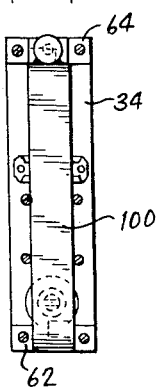 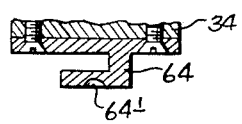
INVENTOR.
LESTER L. JONES
BY
ATTORNEYS United States Patent Office 2,794,155
Patented May 28, 1957

2,794,155

HANDLING AND LOCKING STRUCTURE FOR SWITCHBOARD PANEL UNITS

Lester L. Jones, Oradell, N. J., assignor to Emerson Radio & Phonograph Corporation, Jersey City, N. J., a corporation of New York Application January 4, 1956, Serial No. 557,323

4 Claims. (Cl. 317—120)

This invention consists in a novel combination of elements involving handling and locking devices for panel units for electrical switchboards.

One object of the invention is to provide in a switchboard assembly consisting of a plurality of removable units wherein when the units are in place electrical circuit connections are made, a detachable handle mechanism by means of which the units may be inserted and locked in the assembly and the handle cannot be turned to locking position unless the circuit connections are properly made.

Another object of the invention is to provide a locking device actuated by such handle mechanism by means of which the switchboard panel units may be inserted into the switchboard structure and locked in place.

Another object of the invention is to provide a construction which prevents removal of the handle until the locking mechanism is engaged.

Other and more detailed objects of the invention will be apparent from the following description of the embodiment of the invention illustrated in the attached drawings.

In those drawings,

Figure 2 is a cross-sectional view taken on the line 2—2 of Figure 1;

Figure 3 is a cross-sectional view taken on the line 3—3 of Figure 2;

Figure 4 is a longitudinal, central, cross-sectional detail view of a portion of the locking mechanism;

Figure 5 is a perspective view of the handle structure;

Figures 6 and 7 are diagrammatic views illustrating the manner of applying the handle structure to the panel unit; and Figure 8 is a cross-sectional view taken on the line 8—8 of Figure 6.

Figure 1:
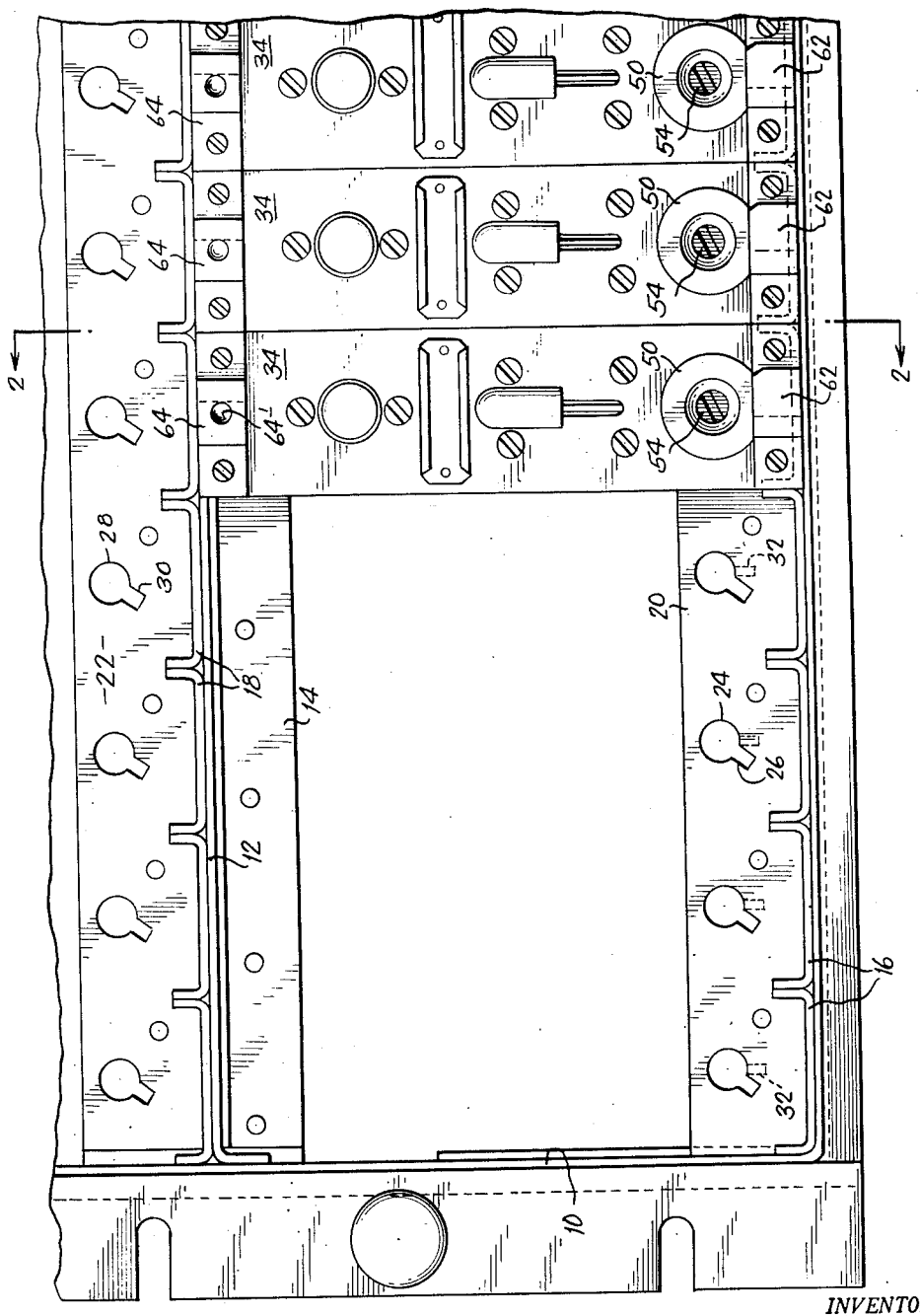
Figure 1 is a broken, front elevational view of a section of a switchboard structure for supporting a plurality of panel units showing some of the details of this invention.

In the present day field of electric switchboard construction it is becoming more and more usual to provide a switchboard supporting framework in which a plurality of detachable panel units are mounted. Each such unit is an electrical sub-assembly of various instrumentalities wired and arranged for what may be termed plugging in connection when the unit is applied to the switchboard frame. This facilitates immediate replacement of the entire unit if something goes wrong therewith, so as to reduce the "out time" of the entire assembly to a minimum.

The general purpose of this invention is to modify the construction of the switchboard frame and panel units to permit of the use therewith of a handle structure by means of which the panel units can be carried about, inserted into the switchboard framework, and removed therefrom as required.

Further in accordance with this invention a locking mechanism is provided actuatable by the handle structure so that the panel units can be locked in operating position. This provides against unwanted circuit disturbances by reason of vibration which might otherwise cause the panel unit to move out of circuit connection position.

Other and more detailed advantages of the structure will be apparent from the following description thereof.

A portion of a switchboard framework or housing is indicated in Figure 1 in front elevation and consists generally of an open front casing 10. This casing is constructed so that it can be mounted on a suitable supporting frame and may be one of a number of such casings used in the entire assembly. As illustrated the casing is provided with a horizontal dividing partition 12 which subdivides the casing into upper and lower compartments. Secured at the rear edge and to the bottom face of the partition 12 is a reinforcing and supporting angle member 14 extending longitudinally of the casing 10 throughout its width.

Mounted on the bottom wall of the casing are a plurality of U-shaped channel or guide members 16 which extend from the front to the back, see also Figure 2; a similar set of guiding channels 18 is mounted on the dividing wall 12.

Referring to Figure 2, extending longitudinally of the casing 10 near the back thereof is a relatively heavy angle iron 20 which, as shown in Figure 1 for example, is provided with a series of substantially circular openings centrally positioned transversely of the channel member 16. Each of these openings has a radial slot 26 connected thereto and lying at a angle to the vertical, as clearly shown in Figure 1. In a similar way a longitudinally extending strip 22, corresponding to the angle iron 20, is secured to the rear edge of the partition wall 12 and the angle brace 14, and it too is provided with a series of circular openings 28 positioned at the transverse center of the channels 18 and having angularly extending radial slots 30.

In practice all of the parts thus far described are commonly of metal and can be secured together into a strong unitary structure in any suitable way as by welding, for example.

Formed in each of the members 20 and 22 so as to lie radially and vertically of the openings 24 and 28 respectively, are the indentations 32, the function of which will be described later.

The panel unit assemblies are illustrated at 34. They are in the form shown of rectangular outline and are suitably dimensioned to fit the requirements of a particular installation. Each unit consists of a series of electrical instrumentalities with the nature of which this invention is not concerned.

As illustrated, secured on the back wall of each panel unit, is a contact board 40 provided with a series of contact members 42 at which the various circuit elements of the unit terminate, in accordance with the required predetermined pattern. As illustrated in Figure 2, there is secured within the casing, for example to the strip 22 as illustrated, an insulating panel 44 which is provided with a corresponding series of circuit contact members 46, arranged for pushing connection with the contacts 42.

At the lower end of each panel unit 34 and on the front wall thereof, is secured a flange bushing 50 which extends through the wall and is clamped in position by means of a lock nut and washer 52. One end of a shaft 54 is rotatably mounted in this bushing and the other end is pinned to a rod-like latching member 56 which is slidably mounted in the rear wall of the panel unit and extends through the contact support board 40, as clearly shown in Figure 4. The exposed end is provided with a radially extending latching pin 58 which cooperates with the latching recess 32, as will be described later. A pair of cooperating dished spring washers 60 are arranged to abut the rear wall of the panel unit and a washer on the member 56 so that the rod 54 and attached member 56 can be pushed rearwardly against the resistance thereof. The forward end of the rod 54 has a diametral slot, see Figures 1 and 2.

Secured at the lower end at the front at each of the panel units, is an L-shaped bracket 62 and at the upper end an oppositely facing L-shaped bracket 64, the form of which is clearly shown in Figure 8. The brackets 62 are of similar structure but bent in the opposite direction.

The handle structure is shown in Figure 5 at 100 which consists of a U-shaped metal strip 66 having a pair of diametral braces 72 and 74 secured thereto to strengthen it and to provide a handle grip. The lower end of the yoke 66 is turned outwardly, as indicated at 68, and the upper end at 70. Welded or otherwise secured to the lower end is what may be termed a screwdriver member 76 having a milled end 78 shaped and dimensioned to have a nice fit with the slot in the end of the rod 54. Secured to the upper end of the handle assembly is a spring loaded bullet catch comprising a housing 80, a plunger 82 and a compression spring 84. Each bracket 64 is provided with a detent or like depression 64' having a shape complementary to the end of the bullet catch 82.

The structure disclosed operates in the following manner. It will be assumed that one of the panel units 34 mounted in the casing is to be removed. In order to do this the handle assembly 100 is picked up and the end 78 of the screwdriver attachment is slipped into the slot on the end of the rod 54 of the unit to be removed. That slot is normally in inclined position, as shown in Figure 1, so that the screwdriver engagement can be effected by positioning the handle assembly 100, as shown in Figure 6, so that the end 78 of the screwdriver member will slip into the slot. At this time the projection 68 on the handle structure 100 clears the other bracket 62 at its open side. To facilitate this association the angled extension 68 of the handle structure is partially cut away, as shown in Figure 5. The handle structure is then pressed inwardly, applying pressure to the rod 54, causing it to move to the right, Figure 2, compressing the disc springs 60. This causes the associated locking pin 58 to move out of the cooperating detent 32 on the member 20. The handle assembly 100 is then swung to vertical position, see Figure 7, at which time the angled ends 68 and 70 move into the L-shaped brackets 62 and 64 respectively.

When the handle is in true vertical position the spring loaded bullet catch 82 engages the detent 64' and the handle is releasably locked in that position. The panel unit 34 can then be pulled out of the casing 10 by an axial pull which breaks all the circuit connections through cooperating connectors 42 and 46. These connectors are usually of the friction type to insure firm electrical connection and require an extra tug to release them. When the rod 54 was turned by the movement of the handle 100 from inclined to vertical position, the latch pin 8 after moving out of the recess 32 was turned into alignment with the associated slot 26 or 30. As the panel unit is withdrawn from the casing the latch pin 58 can pass through the associated member 20 or 22. The unit thus removed can be transported by means of the handle which is of utility as often the panel units can be fairly heavy or of delicate construction requiring certainty against dropping in handling.

A new unit can be inserted into the casing to replace the removed unit by reverse operations. The handle 100 is applied to the unmounted unit as just described with regard to the mounted unit, and the replacement can be inserted into the casing by moving it into the empty channel 16 of 18 and pushing it straight back until it is firmly seated. During this operation the circuit connections are made up between the pair of terminals 42 and 46. As the handle structure 100 is rotated from the position shown in Figure 7 to the position shown in Figure 6 to release it for detachment, the rod 54 is turned back so that the latching pin 58 is moved into alignment with the associated detent 32. As the handle disengages the brackets 62 and 64 the compressed disc washer 60 returns the rod 54 to the left, Figure 2, causing the pin 58 to seat in the notch 32. Thus the panel unit is locked into place and the handle being rotated to the position shown in Figure 6 can be removed.

It will be apparent that the bullet catch 82 while resisting release of the handle, will not prevent it.

From the above description it will be apparent that the details of this invention are subject to variation without departure from the scope of the invention. It is preferred, therefore, that any restriction required be determined by the claims rather than the embodiments selected for illustration.

What is claimed is:

1. A combination of the type described comprising an open front rack having guide members supported therein, contact panels mounted in said rack, a plurality of individual electrical panel units each having contact elements supported thereon, said contact elements engaging said contact panels respectively when said units are placed in said rack and guided to position by said guide members, rotationally mounted locking rods supported on said units respectively, cooperating locking members on said rack, a handle detachably engageable in one position with said rods and rotationally movable to another position to cause said rods to have locking engagement with said locking members to lock said units in said rack, and means for preventing removal of said handle from said rods until said units are locked in said rack.

2. In the combination of claim 1, means for holding said handle in the unlocked position of said rods and locking members to provide a carrying handle for the unit.

3. In the combination of claim 1, said handle being relatively large with respect to the area of the adjacent end face of said unit so as to obscure the face thereof.

4. In the combination of claim 1, said locking rods being axially movable and said locking members having a detent formation and resilient means on said rods for normally urging said locking rods into engagement with said detent formation when in locking position.

References Cited in the file of this patent
UNITED STATES PATENTS

| | | |
|---|---|---|
| 2,273,001 | Mahoney | Feb. 10, 1942 |
| 2,488,372 | Breisch | Nov. 15, 1949 |
| 2,609,268 | Nye | Sept. 2, 1952 |